July 14, 1942. W. A. RAY 2,289,455
THERMOCOUPLE STRUCTURE
Filed Feb. 13, 1940
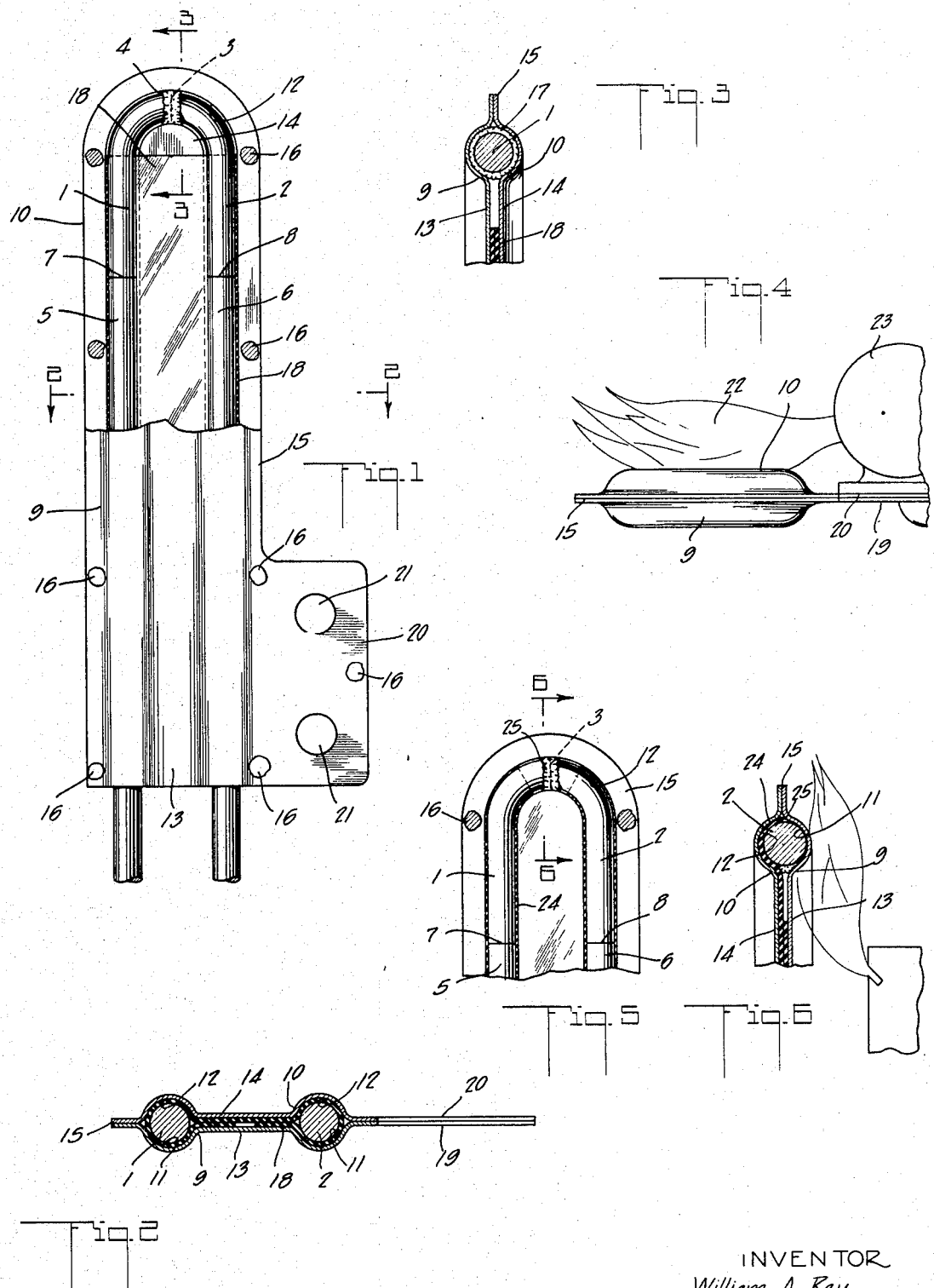
INVENTOR
William A. Ray
BY John Flam
ATTORNEY Patented July 14, 1942

2,289,455

UNITED STATES PATENT OFFICE 2,289,455

THERMOCOUPLE STRUCTURE

William A. Ray, Glendale, Calif.

Application February 13, 1940, Serial No. 318,689

8 Claims. (Cl. 136—4)

This invention relates to a thermocouple structure, and especially such as may be readily utilized for generating a control current for heating systems or the like. The thermocouple depends for its operation upon well understood principles relating to thermoelectricity. This involves the junction of dissimilar metals (such as Chromel and Copel). The alternate junctions are exposed to heat, and there is a resultant generation of a thermoelectric current. A thermocouple structure based on this principle, may be arranged adjacent a pilot burner for a furnace, in position to be affected by the heat of the pilot flame.

It is one of the objects of this invention to provide a thermocouple structure of this character that is simple and inexpensive.

The pilot flame, directed against the "hot" junction, may be affected by a draft, or may be caused to flicker or shift its position for other causes. In many prior types of thermocouples, these flame vagaries may result in intermittent or erratic action of the thermocouple. It is another object of this invention to ensure against such occurrences, by appropriate design of the thermocouple.

It is still another object of this invention to make it possible to support the thermocouple structure in a simple manner.

It is still another object of this invention to provide a thermocouple structure that will quickly respond to temperature variations. In this way, a thermoelectric current of operative value is quickly reached upon lighting of the pilot, and this current decays rapidly upon extinguishing of the flame. This result is secured by ensuring that the hot junction has a large thermal pick-up surface.

This invention possesses many other advantages, and has other objects which may be made more easily apparent from a consideration of several embodiments of the invention. For this purpose there are shown a few forms in the drawing accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawing:

Figure 1 is an enlarged scale elevation, partly broken away, of a thermocouple structure incorporating the invention;

Figs. 2 and 3 are enlarged sectional views taken respectively along plane 2—2 and 3—3 of Fig. 1;

Fig. 4 is a top plan view of the thermocouple structure illustrated in Figs. 1, 2 and 3 and shown as being influenced by a pilot flame;

Fig. 5 is a fragmentary view of a modified form of the thermocouple structure; and Fig. 6 is a sectional view, taken along plane 6—6 of Fig. 5, and illustrating the manner in which a flame may be utilized to operate the thermocouple structure of Fig. 5.

The thermocouple elements may be in the form of relatively short conductors 1 and 2. These conductors are dissimilar metals capable of producing thermoelectric effects. For example, they may be of Chromel and Copel.

Conductors 1 and 2 in this instance are shown as circular in cross section; and the diameter may be in the neighborhood of from .080 inch to .100 inch. Each of the conductors furthermore has its upper end bent in an arc so that they may contact along the line 3, where they are joined together as by appropriate fusion or by welding. This area of fusion 4, neighboring the junction 3 is thus arranged at the top of the bowed construction.

The lower ends of the conductors 1 and 2 extend generally in spaced parallel relation. They may be joined respectively to the copper connectors 5 and 6 as by appropriate fusion, for forming the cold junctions 7 and 8. These copper conductors, having high thermal and electrical conductivity, ensure that heat will be quite rapidly conducted away from the cold junctions 7 and 8.

The thermocouple structure is encased in a sheath, preferably made of sheet metal such as stainless steel or sheet iron. Conveniently the sheath may be made in two halves of similar configuration. These halves are illustrated to best advantage in Fig. 2. The lower half 9 and the upper half 10 are each provided with mating recesses 11 and 12. These recesses define a continuous U-shaped passageway of general circular cross section in which the series of conductors 5, 1, 2 and 6 may be accommodated. Furthermore, the lower and upper halves 9 and 10 provide integral walls 13 and 14 extending entirely across the space between the conductors. These walls 13 and 14 serve effectively as a barrier against movement of air between the spaced conducting elements. The two halves 9 and 10 may be joined together, as by extending the edges of the halves to form a fin or webbing 15 extending around the outside edge of the sheath. The edges of the two halves 9 and 10 may be joined together in any appropriate manner as by a series of spot welds 16 (Fig. 1).

The metallic sheath structure 9—10 provides a large thermal pickup surface for conducting heat to the hot junction 3. For this purpose as illustrated most clearly in Fig. 3, the sheath 9—10 is joined as by a narrow annulus 17 of welded on metal directly to the hot junction 3. This metal is accommodated in the narrow clearance space between conductors 1 and 2 and the recesses 11 and 12. Weld 17 thus affords a good thermal connection between the sheath structure and the hot junction 3. This connection is confined to the place neighboring the hot junction 3.

Along the remainder of the passageway 11—12 the conducting members 5, 1, 2 and 6 are maintained out of electrical and thermal contact with the sheath structure 9—10. In order to accomplish this result, use may be made of a thin sheet of insulation material 18 such as mica, which lines the passages 11—12 throughout their straight portions. A single sheet of mica 18 may be utilized in the manner shown in Fig. 2, forming loops around the conductors 1, 5 and 2, 6, in the passageway 11—12. The walls 13 and 14 of the sheath are spaced apart to accommodate the double layer of this insulation sheet. The insulation sheet 18 extends up to the bowed ends of the thermoelectric conductors 1 and 2. Around the bow, the ends of the conductors 1 and 2 are merely out of contact with the walls of the passageway, except for the integral union 17 between the sheath and the hot junction 3.

In order to facilitate supporting the structure on or near a pilot flame burner, the halves 9 and 10 of the sheath are shown as provided with integral bracket extensions 19 and 20. These extensions are located adjacent the lower portion of the sheath 9—10, and are joined together as by the spot welds 16. Apertures 21 may be provided for the passage of appropriate fastening elements such as screws or bolts.

Fig. 4 illustrates the thermocouple structure influenced by a flame 22 projecting from a pilot burner 23. This flame affects the hot junction 3, because it plays upon that portion of the sheath 9—10, which is in thermal conducting relation to the hot junction 3. The heat is conducted effectively to this hot junction with attendant thermoelectric effects. In the event that the flame 22 be accidentally extinguished, the large exposed area of the sheath 9—10 ensures rapid dissipation of the heat from the hot junction 3, with an attendant rapid decay of the thermoelectric current. The barrier formed by the walls 13 and 14 ensures against fluttering of the flame 22 by erratic draft effects. Thereby it is assured that the flame 22 will not be readily projected out of operative relation with respect to the thermocouple structure.

In the form of the invention illustrated in Figs. 5 and 6, the sheath 9—10 is arranged in a manner substantially identical with the form illustrated in Fig. 1. However, in this case the hot junction 3 is integrally welded only to the recess 11 in the half 9. The recess 12 neighboring the hot junction 3 is lined with the layer 24 of insulation. This insulation member 24 extends completely around the conductors 5, 1, 2 and 6, except where it is cut away to accommodate the welding 25 (Fig. 6). Accordingly only the right hand side of the thermocouple structure is sensitive. Any draft proceeding from the left hand side of the thermocouple structure will not cool the hot side. Other advantages similar to that outlined in connection with the form illustrated in Fig. 1, are also attained in this form.

What is claimed is:
1. In a thermocouple structure, a pair of conductors of dissimilar metals, and joined together to form a thermoelectric junction, said conductors extending from the junction in a common direction, and being spaced apart except neighboring the junction, a sheath made of thin metal and having spaced passageways for the accommodation of the conductors, said metal extending across from one passageway to the other, said sheath being in good thermal transfer relation to the junction, and insulation material interposed between the conductors and the sheath, for retarding heat transfer between the sheath and those parts of the conductors removed from the junction.

2. In a thermocouple structure, a pair of conductors of dissimilar metals, and joined together to form a thermoelectric junction, said conductors extending from the junction in a common direction, and being spaced apart except neighboring the junction, and a metallic sheath enclosing the conductors, and having a wall occupying the space between the conductors, said sheath being in good thermal transfer relation to the junction, and otherwise out of electrical contact with said conductors.

3. In a thermocouple structure, a pair of conductors of dissimilar metals, and joined together to form a thermoelectric junction, said conductors extending from the junction in a common direction, and being spaced apart except neighboring the junction, a metallic sheath enclosing the conductors, and having a wall occupying the space between the conductors, said sheath being in good thermal transfer relation to the junction, and insulation material interposed between the conductors and the sheath, for retarding heat transfer between the sheath and those parts of the conductors removed from the junction.

4. In a thermocouple structure, a pair of conductors of dissimilar metals, each of said conductors having a laterally projecting end, said ends being joined together to form a thermoelectric junction, the free ends extending in the same direction so that the conductors form an intervening space, and a metallic sheath enclosing said conductors and having a wall extending across said space, said metallic sheath being out of intimate heat transfer relation with the conductors except at the junction.

5. In a thermocouple structure, a pair of conductors of dissimilar metals, each of said conductors having a laterally projecting end, said ends being joined together to form a thermoelectric junction, the free ends extending in the same direction so that the conductors form an intervening space, a metallic sheath enclosing said conductors and having a wall extending across said space, and insulation material between the sheath and those parts of the conductors removed from the junction.

6. In a thermocouple structure, a pair of conductors of dissimilar metals, each of said conductors having a laterally projecting end, said ends being joined together to form a thermoelectric junction, the free ends extending in the same direction so that the conductors form an intervening space, a metallic sheath enclosing said conductors and having a wall extending across said space, means whereby the structure is rendered sensitive to a flame on one side only of the wall, and means for maintaining the sheath out of electrical contact with at least those portions of both conductors that are remote from the junction.

7. In a thermocouple structure, a pair of conductors of dissimilar metals, each of said conductors having a laterally projecting end, said ends being joined together to form a thermoelectric junction, the free ends extending in the same direction so that the conductors form an intervening space, a metallic sheath enclosing said conductors and having a wall extending across said space, and means whereby the structure is rendered sensitive to a flame on one side only of the wall comprising a layer of insulation extending all around the conductors between the sheath and the conductors, except at one side of the junction where the sheath and the junction are in heat transfer relation.

8. In a thermocouple structure, a pair of conductors of dissimilar metals, and joined together to form a thermoelectric junction, and a metallic sheath enclosing said conductors, said sheath being in good thermal transfer relation to the junction, and otherwise out of electrical contact with said conductors, said sheath having a portion forming a barrier extending between the conductors for preventing air currents from one side of the structure to the other.

WILLIAM A. RAY.